United States Patent [19]

Kondo et al.

[11] 4,022,303
[45] May 10, 1977

[54] MOUNTING STRUCTURE FOR A DISC BRAKE ACTUATOR

[75] Inventors: Toshio Kondo, Chiryu; Yoshinori Mori; Masakazu Ishikawa, both of Toyota, all of Japan

[73] Assignees: Aisin Seiki Kabushiki Kaisha, Kariya; Toyota Jidosha Kogyo Kabushiki Kaisha, Toyota, both of Japan

[22] Filed: Mar. 3, 1976

[21] Appl. No.: 663,232

[30] Foreign Application Priority Data

Mar. 4, 1975 Japan .............................. 50-26141

[52] U.S. Cl. .............................. 188/73.3; 188/73.6
[51] Int. Cl.² ........................................ F16D 65/20
[58] Field of Search .............. 188/71.1, 72.4, 73.1, 188/73.3, 73.6

[56] References Cited
UNITED STATES PATENTS

| | | | |
|---|---|---|---|
| 3,081,843 | 3/1963 | Dotto et al. .................... | 188/73.6 |
| 3,682,277 | 8/1972 | Brown ............................ | 188/73.3 |
| 3,882,972 | 5/1975 | Newstead et al. ................ | 188/73.6 |
| 3,942,611 | 3/1976 | Burnett .......................... | 188/73.3 |
| R26,746 | 12/1960 | Hayes ........................... | 188/72.4 |

FOREIGN PATENTS OR APPLICATIONS 679,845   1/1965   Italy .................................. 188/73.3

*Primary Examiner*—Trygve M. Blix
*Assistant Examiner*—Edward R. Kazenske
*Attorney, Agent, or Firm*—Pierce, Scheffler & Parker

[57] ABSTRACT

A disc brake for vehicles comprising friction pads adapted to be urged by hydraulic actuator into engagement with opposite faces of a friction disc, the hydraulic actuator having a sliding fit on a stationary part of a vehicle wheel and straddling a peripheral portion of the brake disc together with the pads. The hydraulic actuator is slidingly supported on a pair of parallel guiding pins one of which directly extends from the stationary part while the other pin is removably secured to the stationary part with a sufficient clearance to secure a tolerance extinguishing-ability for the guiding pins and their associated parts.

5 Claims, 5 Drawing Figures

MOUNTING STRUCTURE FOR A DISC BRAKE ACTUATOR

BACKGROUND OF THE INVENTION

This invention relates to a vehicle disc brake device of the kind in which friction pads are adapted to be urged by hydraulic acting means into engagement with opposite faces of a friction disc and the hydraulic acting means being a sliding fit on a stationary part of a vehicle wheel and straddling a periphery portion of the brake disc together with the pads.

In the known device of this kind, the hydraulic fluid acting means is slidably supported on a pair of parallel guiding pins projecting from the stationary part of the vehicle wheel. For safety braking purpose, an early or prompt response to the varying brake operating fluid pressure is required for the brake device. To meet such requirement, the fluid acting means must normally be kept in a sufficiently sliding fit condition on the guiding pins. In order to hold the hydraulic acting means in sufficiently sliding fit condition on the pins, severe accuracy of parallel relationship is required between the two pins when installed. The same accuracy is also required between a pair of corresponding engagement portions in the fluid acting means, with the space therebetween strictly in accord with that of the pins. This requirement is apt to impose a heavy burden upon manufacturing the device and considered therefore to be a disadvantage in saving the substantial manufacturing costs.

In has heretofore been known in the art that deformable resilient means such as rubber member may be adapted to be inserted between the hydraulic acting means and the pins in order that installation or manufacturing of the parts may be considerably tolerated. However, such spacer means has never proven to be sufficient by reason of the fact that an amount of deformation as would sufficiently allow a desired degree of such tolerance otherwise exhibits a tendency to cause an objection to holding the hydraulic acting means normally in best sliding condition on the pins.

SUMMARY OF THE INVENTION

Principal object of the present invention therefore is to provide a disc brake having improved means for normally readily attaining a sufficient sliding fit of the saddle member on the stationary part or member when installed in order, thereby, to secure the earliest responsing ability to the varying brake operating fluid pressure, without necessity of such severe limitation of the tolerance of the parts.

The foregoing object and others are attained according to at least one aspect of the present invention through provision of a pair of parallel guiding means. One of the guiding means projects directly from the stationary member and slidingly supports thereon the saddle member and the other one is removably bolted or otherwise secured to the stationary member subsequently to assembling the saddle member to the said directly projecting guiding means and also slidingly supports thereon the saddle member so that the desired accuracy of the parallel relationship thus results between the pair of guiding means without any conscious effort together with the strict space accord between the pair of guiding means and the corresponding engaging portions in the saddle member.

Another object of the invention is to provide means for beneficially disconnecting the removably bolted guiding means from the stationary member in order that the saddle member may readily be turned through an angle about the other directly guiding means in case of repairing the device, such as for example, renewal of the worn braking pads.

Thus in the disclosed embodiment of the present invention there is provided a friction disc secured to a rotational portion of a vehicle wheel assembly to rotate therewith, a stationary member secured to a fixed portion of the vehicle wheel assembly, a movable member being a sliding fit on the stationary member, brake actuating means fluidically operated within the movable member, a first pad being a sliding fit on the stationary member for shifting in the axial direction of the disc to be applied to one face of the disc by the brake actuating means in the braking operation, and a second pad carried by the stationary member also to be brought into contact with the opposite face of the disc under reaction force derived from application of the first pad to the friction disc. One of the guiding means is secured to the stationary member by means of a removable bolt with a sufficient clearance provided between the bolt and an associated portion of the guiding means.

DESCRIPTION OF THE PREFERRED EMBODIMENT

Figure 1:
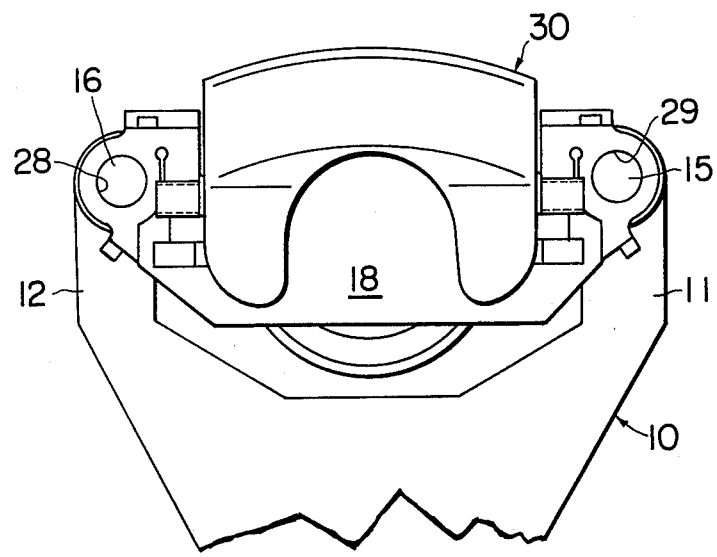
FIG. 1 is an elevational view of the device according to the present invention.
Figure 2:
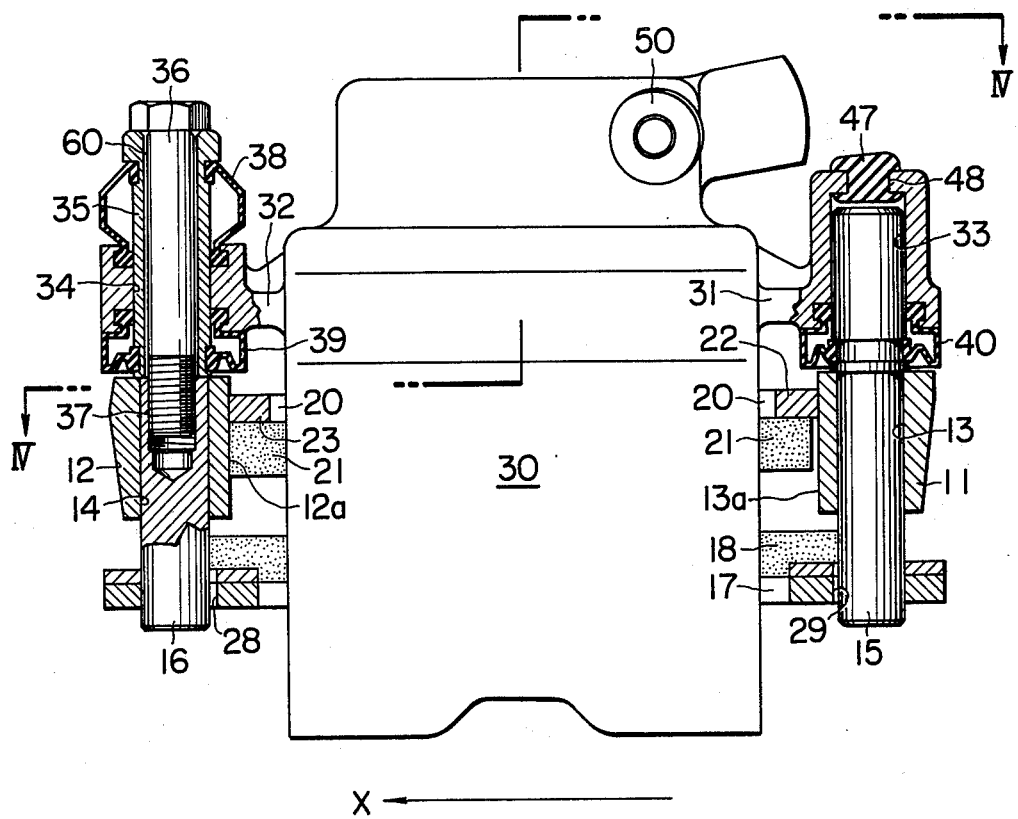
FIG. 2 is a plan view of the device of FIG. 1.
Figure 3:
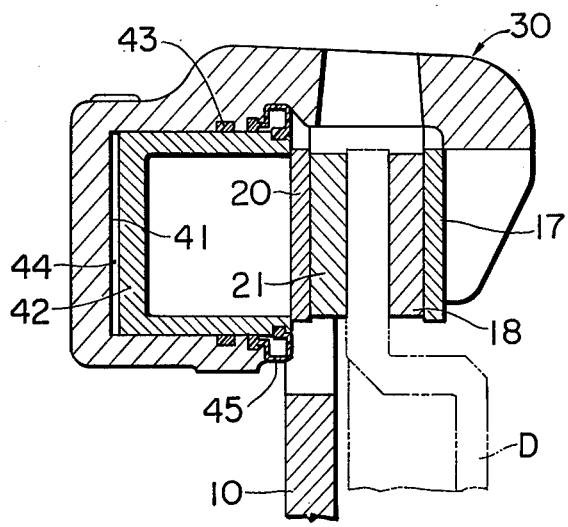
FIG. 3 is a cross sectional view taken along the line III—III in FIG. 4.
Figure 5:
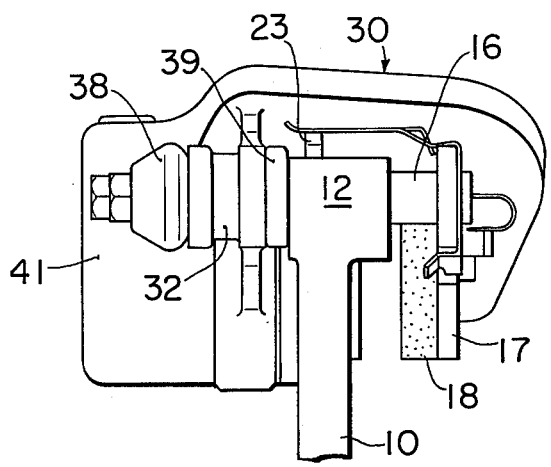
FIG. 5 is a side view from the left in FIG. 2.
Figure 4:
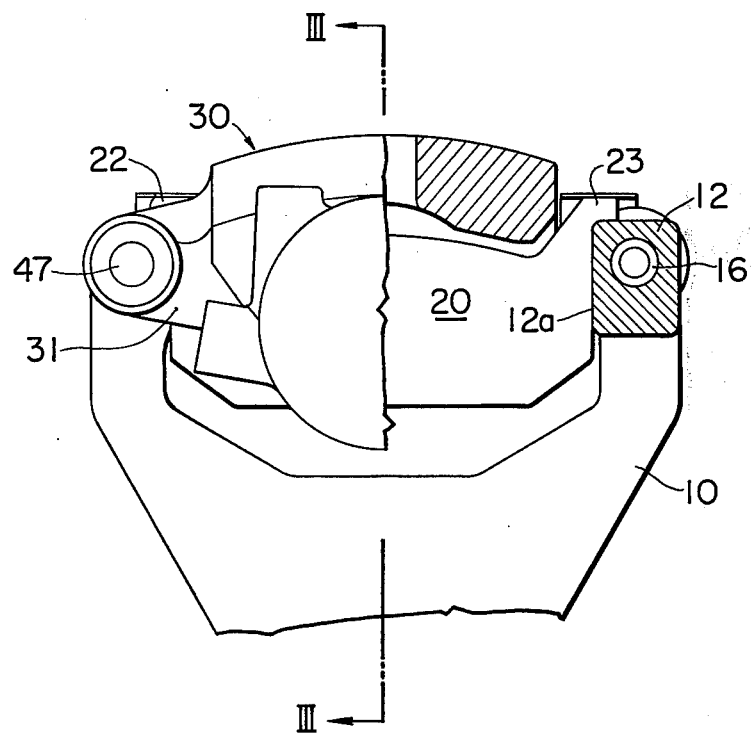
FIG. 4 is another elevational view of the device of the invention viewed from the opposite side to that of FIG. 1, half of which is a cross sectional view taken along the line IV—IV in FIG. 2.

In the brake illustrated in FIGS. 1 to 5, a stationary member generally indicated at 10 has a pair of spaced arms 11 and 12 having respectively eyes 13 and 14 at their extremities as best shown in FIG. 2. The stationary member 10 is secured to a fixed support portion (not shown) of a vehicle wheel (not shown) axle forming a stationary part of a wheel assembly, the stationary member 10 being secured to the stationary part adjacent to one side of a brake disc D (FIG. 3). The eye 13 of the arm 11 receives therein firmly a pin 15 projecting at both sides of the eye 13. The other eye 14 receives therein firmly a shorter pin 16 extending at one side of the eye 14. As will be seen in FIG. 2, the pins 15 and 16 are parallel with each other and carry slidably a backing plate 17 with its holes 28 and 29 sliding fit thereon. To the backing plate 17 is bonded or otherwise secured an outer lining 18 to form an indirectly actuated pad assembly. Another backing plate 20 is provided with on its inside face an inner lining 21 also bonded or otherwise secured thereto to form a directly actuated pad assembly as best shown in FIGS. 2 and 3. The backing plate 20 is formed with a pair of lugs 22 and 23 extending from opposite edges thereof as will best be shown in FIG. 4 in order to provide means to be slidingly supported thereby. Both lugs 23 and 22 are a sliding fit on a pair of internal right-angled faces 12a and 13a respectively. It will be noted that the backing plate 20 in FIG. 4 is thus slidable on the arms 12 and 13 in the direction perpendicular to the plane of the drawing.

The holes 28 and 29 in the first backing plate 17 are illustrated in FIG. 1 as being of elliptically elongated holes. However, the holes otherwise may be pure circular form, provided that the diameter of each hole is a larger one sufficient to allow a clearance space when installed between the corresponding pin and the hole at the arcuate inside face of each pin taking the inner side to be the space between the pins 15 and 16. This is very important to obtain a desired result which will be apparent as the discussion proceeds.

The hydraulic acting means has a saddle or caliper 30 which may be referred to as a movable member of the brake assembly. The saddle 30 has first and second support means in the form of a pair of arms 31 and 32 extending from the opposite sides of the caliper 30 as best shown in FIG. 2. At the extremity of the arm 31, the caliper 30 is formed with a blind bore 33 as shown in FIG. 2 and at the extremity of the other arm 32 a through bore 34. Both bores 33 and 34 are axially parallel with each other. The blind bore 33 receives therein slidably the extremity of the pin 15 and the bore 34 receives also slidably therein a sleeve or bush 35. The sleeve 35 is assembled to the arm 12 of the stationary member 10 by means of bolt 36 which is threaded into a correspondingly internally screwed bore 37 of the pin 16 as will be seen in FIG. 2. It should be noted that the bolt 36 is diametrically sufficiently smaller than the internal diameter of the bore 60 of the sleeve 35 so that the screwed connection between the bolt 36 and the bore 37 may be tolerated in order not to affect the desired sufficient sliding fit of the saddle member 30 on both of the pin 15 and sleeve 35.

Rubber boots 38, 39 and 40 are provided for excluding the dirt from the corresponding surface of the sleeve 35 and pin 15 in the known manner.

Referring particularly to FIG. 3, a cylinder 41 is incorporated in caliper 30 and has a piston 42 therein. As usual, the cylinder 41 has rubber ring 43 embedded in a corresponding annular groove in the internal face of the cylinder 41. The ring 43 provides the known means to retract the piston 42 to the rest position when the fluid pressure is released in the chamber 44 defined between the internal end face of the cylinder 41 and the acting face of the piston 42. A rubber boot 45 at the open end of the cylinder 41 excludes the dirt from the sliding surface of the piston. As seen in FIG. 3, the saddle member 30 straddles a peripheral portion of the brake disc D together with pad assemblies at the opposite sides of the disc D. The piston 42 working in the cylinder is adapted to apply to the disc D the directly actuated lining 21 on the backing plate 20.

The other lining 18 bonded to the backing plate 17, known as the indirectly actuated friction pad assembly, is in abutment engagement with the inside of the saddle member 30 remote from the hydraulic cylinder 41.

The admission of pressure fluid into the chamber 44 results in displacement of said piston and saddle member in the directions towards each other. Such movement of piston 42 urges the lining 21 into contact with the brake disc D while the saddle member 30 is caused to move under the reaction force so as to bring the other lining 18 on the opposite side of the friction disc D into contact therewith.

When the brake is applied under the rotational condition of the vehicle wheel, assuming that the direction is in the X arrow direction in FIG. 2, the resulting drag force on the lining 21 will be directly taken by the arm 12 through its right angled inside face 12a and the lug 23 of the backing plate 20. The drag force on the other lining 18 is taken by the pin 15 through the corresponding hole 29 of the backing plate 17 on which is bonded the lining 18.

In case of reverse rotational direction of the disc D, a reversal takes place in bearing against the resultant drag force on the linings 18 and 21, respectively. This will be readily understood from the foregoing, without any duplicated description.

It will be further understood from the foregoing that a drag force on the lining 18 is taken by either one of the pins 15 and 16 opposed to any one of the arms 11 and 12 by which a drag force on the other lining 21 is directly taken. In other words, two bearing portion on the pin and the arms against such drag forces are in diagonally disposed relation in FIG. 2.

At the upper right in FIG. 2 is shown a rubber plug 47 which engages a hole 48 in the end wall of the bore 33 with sufficient but slight clearance therebetween in order to allow air to enter into or be exhausted from the bore in operation. The hole 48 is helpful to remove dirt within the bore 33 which was produced during the manufacture of the device.

The cylinder 41 has a port 50 which provides a passage for the flow of hydraulic or other pressure fluid, as usual.

What is claimed is:

1. A disc brake comprising;
a friction disc secured to a rotational portion of a vehicle wheel assembly to rotate therewith,
a stationary member secured to a fixed portion of the vehicle wheel assembly and having a pair of radially extending arms defining a space therebetween, each said arm being provided with through bores, said through bores being parallel with an axis of rotation of said disc,
a pair of parallel pin members respectively inserted into said bores securely to provide a rigid connection of the pin members with the stationary member such that the pin members protrude from the same side of the arms,
a sleeve secured to one of said arms on the side opposite to that from which said pin member protrudes, said sleeve being tightened to the arm by means of a bolt having a head and passing through the sleeve with clearance and with said head clamping the sleeve to said arm so that the sleeve is loaded under compression,
a guiding member secured to the other of said arms of the stationary member on the same side thereof as the sleeve,
a movable caliper member having a pair of laterally extending arms, said movable caliper member being provided with a through bore in one of said arms to slidably receive said sleeve and a blind bore in the other of said arms to slidably receive said guiding member so that the movable caliper member can slide on said sleeve and on said guiding member along the axis of rotation of the disc,
fluidically operated brake actuating means disposed within said movable caliper member,
a first pad having both sides thereof slidably arranged on said arms of said stationary member for shifting along the rotational axis of said disc and engageable with one face of said disc by said brake actuating means in braking operation, a second pad having both sides thereof slidably arranged on said pair of pin members to be brought into contact with the opposite face of said disc as the result of the sliding movement of said movable caliper member due to a reaction force set up by engagement of said first pad with the disc, rubber boots being provided between both sides of said one of said arms of the movable caliper member and the sleeve to exclude dirt, and a second rubber boot provided between the other of said arms of the movable caliper member and said guiding member.

2. A disc brake according to claim 1, wherein said guiding member is provided by extending the other of said pin members oppositely beyond the arm to which said other of said pin members is secured.

3. A disc brake according to claim 1, wherein one of said pin members is provided with a tapped hole for receiving a screw-threaded portion of the bolt at one end adjacent said sleeve.

4. A disc brake according to claim 1, wherein said second pad is provided with a pair of ears each having a hole for receiving said pin members.

5. A disc brake according to claim 1, wherein said blind bore has a hole, and further comprising a rubber plug for sealing the hole.

* * * * *